United States Patent [19]

Shapiro et al.

[11] Patent Number: 5,797,031

[45] Date of Patent: Aug. 18, 1998

[54] METHOD AND APPARATUS FOR PERIPHERAL DEVICE CONTROL BY CLIENTS IN PLURAL MEMORY ADDRESSING MODES

[75] Inventors: Raymond E. Shapiro, Marlborough, Mass.; Paul C. Stanley, Houston, Tex.; Steven Schumacher, Brighton, Mass.

[73] Assignee: SystemSoft Corporation, Natick, Mass.

[21] Appl. No.: 920,096

[22] Filed: Aug. 26, 1997

Related U.S. Application Data

[63] Continuation of Ser. No. 458,665, Jun. 2, 1995, abandoned.

[51] Int. Cl.⁶ .................................................. G06F 13/00
[52] U.S. Cl. ..................... 395/828; 395/840; 395/856; 395/868; 395/733; 395/281
[58] Field of Search .................... 395/650, 700, 395/733, 425, 400, 375, 281, 828, 840, 856, 868

[56] References Cited

U.S. PATENT DOCUMENTS

| | | | |
|---|---|---|---|
| 5,193,161 | 3/1993 | Bealkowski et al. | 395/400 |
| 5,367,658 | 11/1994 | Spear et al. | 395/425 |
| 5,404,471 | 4/1995 | Kawano et al. | 395/375 |
| 5,414,848 | 5/1995 | Sandage et al. | 395/650 |
| 5,475,846 | 12/1995 | Moore | 395/733 |
| 5,497,490 | 3/1996 | Harada et al. | 395/700 |
| 5,497,494 | 3/1996 | Combs et al. | 395/750 |
| 5,497,497 | 3/1996 | Miller et al. | 395/800 |
| 5,519,851 | 5/1996 | Bender et al. | 395/500 |
| 5,530,858 | 6/1996 | Stanley et al. | 395/650 |
| 5,537,558 | 7/1996 | Fletcher et al. | 395/309 |
| 5,537,597 | 7/1996 | Sandage | 395/700 |
| 5,537,654 | 7/1996 | Bedingfield et al. | 395/834 |
| 5,541,853 | 7/1996 | Croft | 364/514 |
| 5,542,055 | 7/1996 | Amini et al. | 395/281 |
| 5,577,220 | 11/1996 | Combs et al. | 395/416 |
| 5,603,014 | 2/1997 | Woodring et al. | 395/500 |

OTHER PUBLICATIONS

Mori, Michael T., Welder, W. Dean, *The PCMCIA Developer's Guide*, (1994–95), Sycard Technology, pp. 19–26, 68, 80–87, 109–110, 115–159, 177–181, 193–198, 219–222, B–1–B–106, C–1–C–33, D–1–D–50.

Primary Examiner—Christopher B. Shin
Attorney, Agent, or Firm—Testa, Hurwitz, and Thibeault, LLP

[57] ABSTRACT

A digital data processor has a central processing unit (CPU) that operates in plural addressing modes and or more adapters for receiving peripheral devices, e.g., PCMCIA devices. A first peripheral device service subsystem that handles communications between peripheral devices coupled to the adapters and software clients executing on the CPU in a first addressing mode. A second peripheral device service subsystem that handles communications between peripheral devices coupled to the adapters and clients executing on the CPU in a second addressing mode. The first peripheral device subsystem includes a configuration management section that allocates digital data processor resources, e.g., memory space, input/output channels, direct memory access (DMA) channels and interrupt (IRQ) levels, used for communications between the peripheral devices and clients, regardless of whether those clients are executing in the first or second addressing modes.

27 Claims, 4 Drawing Sheets

5,797,031

METHOD AND APPARATUS FOR PERIPHERAL DEVICE CONTROL BY CLIENTS IN PLURAL MEMORY ADDRESSING MODES

This is a continuation of application Ser. No. 08/458,665 filed on Jun. 2, 1995, abandoned.

NOTICE OF COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyrights whatsoever.

BACKGROUND OF THE INVENTION

This invention relates to digital data processing, and more particularly, to the control of peripheral devices that are coupled with a computer.

Personal computers are increasingly present in the home and office. With the advent of new user interfaces, such as Microsoft® Windows™, those computers are now easier to use and, hence, are gaining more ready acceptance in the marketplace.

Impediments to wide acceptance of personal computers, especially among beginning and intermediate level users, are difficulties in adding new components, such as peripheral devices, and configuring them. For example, in order to add a "modem" that permits a personal computer to communicate with others over phone lines, the user may be required to disassemble the computer, insert a circuit board, reassemble the computer and, then, configure its software. This latter step is often the most difficult, requiring the user to resolve conflicts for system resources, such as port assignments (e.g., COM1 or COM2) between the modem and other components of the computer system.

Two developments alleviate these difficulties. The so-called PCMCIA cards, or "PC CARD's," facilitate physically connecting peripheral components to a personal computer. These devices are credit card-sized units that plug into recessed sockets accessible from the outside of the personal computer cabinet. The other advance is the Plug and Play feature of Microsoft® Windows™ 95 operating system. This software feature automatically resolves conflicts among components that compete for system resources, such as port assignments, interrupt (IRQ) levels, memory space and direct memory access (DMA) channels. The Plug and Play feature relies on the interaction of a number of software components, such as a Configuration Manager and a Registry, to determine the resource needs of system components and to resolve conflicts on a dynamic basis.

To this end, the Plug and Play subsystem requires that users upgrade the PC CARD's, peripherals and other hardware or software components of their systems to ensure that each component has an encoded identification, which Plug and Play relies on to determine resource requirements. The construction and operation of Windows™ 95 and its Plug and Play feature are well known in the art. See, for example, the *Hardware Design Guide for MicroSoft® Windows™ 95* (MicroSoft Press 1994) and Kelsey, *Programming Plug and Play* (Sam's Publishing 1995), Mori, *The PCMCIA Developers' Guide* (Sycard Technology 1994), and King, *Inside Windows™ 95* (MicroSoft Press 1994). Versions of that software package have also been widely commercially available to members of the public on a trial basis for some time.

The Plug and Play feature of Windows™ 95 operates under the "protected" mode of the omnipresent "386" class of microprocessors (e.g., the Intel 80386, Intel 80486 and Intel Pentium™ microprocessors). Thus, although Windows™ 95 represents an advance over prior operating systems, it does not fully meet the needs of users whose computers have less advanced system components and, specifically, whose system components operate under software "clients" that execute only under the "real" mode of microprocessor execution, e.g., DOS drivers and software applications.

As originally envisioned, PCMCIA cards were intended to handle a single function per card. Thus, vendors initially provided separate cards that served respective functions such as modem communications, network communications, memory (SRAM and hard disk), and so forth. Vendors are now supplying multi-function PCMCIA cards, such as combined modem/LAN adopters. Due to architectural constraints, these multi-function PCMCIA cards are limited to using a single hardware interrupt (IRQ) channel for all functions. This has proven to be problematic for using multi-function PCMCIA cards, as well as for other multi-function hardware devices used in a computer.

One problem posed by multi-function devices arises in integrating such hardware into the standard device driver environment, particularly, in the Windows™ 3.x and Windows™ 95 operating systems. Drivers in these environments typically do not allow sharable interrupts. Moreover, under Windows™ 95, the layered driver model makes difficult implementing drivers for certain classes of devices sharing an interrupt.

Another problem posed by multi-function devices is integration of protected mode device drivers running as VxD's in Windows™ 95 into the interrupt-sharing interface developed by the PCMCIA Standards Committee. These drivers do not have access to the standard PCMCIA calls specified in the newest PCCARD Standard, as defined by that same Committee. This is because the PCMCIA implementation runs in real mode, while the VxD's run in protected mode under Windows™.

Accordingly, an object of this invention is to provide improved digital data processors and, more particularly, improved methods and apparatus for configuring and utilizing components, such as peripheral devices, in personal computers.

Still another object of this invention is to provide improved methods and apparatus for managing communications between a personal computer and peripheral components, such as PCMCIA cards, connected therewith. Still another object of the invention is to provide improved methods and apparatus for using both protected mode and real mode software clients to control (and communicate with) components of 386-class digital data processing apparatus.

Still another object of the invention is to provide improved control of multi-function hardware devices, such as modem/LAN PCMCIA cards.

SUMMARY OF THE INVENTION

The foregoing objects are attained by the invention which provides, in one aspect, a digital data processor of the type having a central processing unit (CPU) that operates in plural addressing modes, e.g., the "protected" and "real" modes of 386-class microprocessors, and having one or more adapters for receiving peripheral devices, e.g., PCMCIA devices.

The digital data processor includes a first peripheral device service subsystem that handles communications between peripheral devices coupled to the adapters and software clients executing on the CPU in a first addressing mode, e.g., protected mode. It also includes a second peripheral device service subsystem that handles communications between peripheral devices coupled to the adapters and clients executing on the CPU in a second addressing mode, e.g., real mode. The first peripheral device subsystem includes a configuration management section that allocates digital data processor resources, e.g., memory space, input/output channels, direct memory access (DMA) channels and interrupt (IRQ) levels, used for communications between the peripheral devices and clients, regardless of whether those clients are executing in the first or second addressing modes. The CPU can be, for example, a microprocessor with an architecture similar to that of the Intel 80386, Intel 80486, or Pentium™ microprocessors.

In a further aspect, the invention provides a first peripheral device service subsystem, as described above, which includes a higher-level interface layer that coordinates accesses between protected mode clients and peripheral devices received in the adapters. The first peripheral device service subsystem also includes a lower-level interface layer that controls and transfers information to/from each adapter and the peripheral device(s) coupled thereto.

An interrupt/poll section, coupled with the higher-level interface layer, can notify that layer of changes in the status of an adapter with respect to a peripheral device, e.g., insertion or removal of the peripheral device. The higher-level interface layer can respond to such notification by making a status request to the lower-level interface layer which, itself, normally responds by indicating the current status of the adapter and any peripheral device coupled to it.

According to one aspect of the invention, the higher-level interface layer is a "card services" layer, as that term is defined by the PCMCIA and PCCARD Standards Committee and as that term is known in the art. The lower-level interface layer is a "socket services" layer as that term is likewise defined. The aforementioned status request is a "GET STATUS" function of the type also so defined for use by a card services layer in requesting status information from a socket services layer.

According to a further aspect of the invention, the lower-level interface layer responds to a status request received subsequent to insertion of a peripheral device in an adapter for initiating a determination of the type of client the device is expected to communicate with, i.e., a client that executes in the first or the second addressing modes. The lower-level interface layer can initiate that determination by signaling an extension of the higher-level interface layer. That extension responds to such signaling by identifying an expected client, e.g., by comparing an identification of the inserted peripheral device with a registry of such devices and their clients.

On determining that an inserted peripheral device will communicate with a client executing in the second addressing mode, e.g., real mode, the extension of the higher-level interface layer can respond to identification of a peripheral device that is expected to communicate with clients executing in the second addressing mode by (i) causing the lower-level interface layer to respond to the status request it received from the higher-level interface layer with a signal indicating that no peripheral device was inserted in the adapter, and (ii) invoking the second peripheral device service subsystem to handle all communications between the peripheral device and clients executing in the second addressing mode.

In still another aspect, the invention provides an extension of the higher-level interface layer as described above which, further, responds to identification of a peripheral device that is expected to communicate with clients in the first addressing mode by causing the lower-level interface layer to respond to the aforementioned status request normally, i.e., by signaling the higher-level interface layer of the current status of the selected adapter and peripheral device therein. The higher level interface layer responds to such signaling by handling communications between the peripheral device and one or more clients executing in the first addressing mode.

According to still further aspects of the invention, the extension of the higher-level interface layer invokes the second peripheral device service subsystem via an inter-subsystem gateway. Particularly, in response to signaling by the extension, the gateway invokes the second peripheral device service subsystem for purposes of handling communications between a peripheral device and one or more clients executing in the second addressing mode. In this regard, the inter-subsystem gateway can transfer to the configuration management section of the first peripheral device service subsystem an indication of the resources that will be required for communications between the peripheral device and those clients. The first peripheral device service subsystem can, itself, include enumerator sections that transfer to the configuration management section necessary for communications between peripheral devices and clients executing in the first addressing mode.

According to another aspect of the invention, on determination by the extension of the higher-level layer that an inserted peripheral device will communicate with a client executing in the second addressing mode, the inter-subsystem gateway alter the apparent identification of the peripheral device to one associated with a client that executes in the first addressing mode, e.g., protected mode. As a result, software running in the first addressing mode on the CPU can directly access the peripheral device.

These and other aspects of the invention are evident in the drawings and in the description that follows.

BRIEF DESCRIPTION OF THE DRAWINGS

A further understanding of the invention may be attained by reference to the drawings, in which.

DETAILED DESCRIPTION OF THE ILLUSTRATED EMBODIMENT

Figure 1:
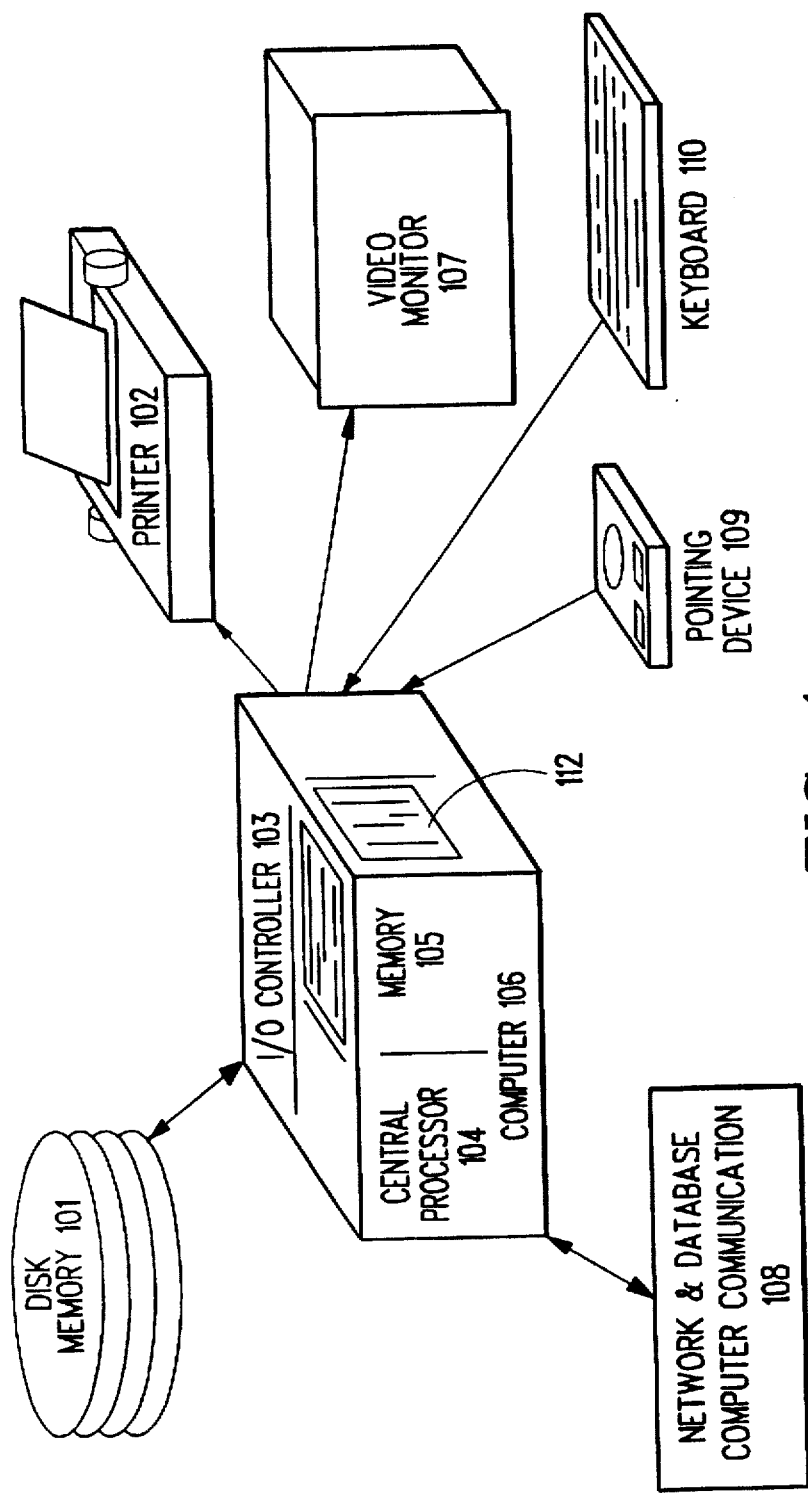
FIG. 1 illustrates a digital data processing system of the type used to practice the invention.

FIG. 1 illustrates a digital data processing system of the type used in connection with practice of the invention. Computer 106 is connected to data processing peripheral units comprising a disk memory 101, a computer communications network 108, a video monitor 107, a keyboard 110, and a pointing device 109. The disk memory 101 serves as a non-volatile storage element for information accessed by the computer 106. The computer communications network 108 serves to allow access to non-volatile storage elements and databases or other peripheral devices among a collection of computers. The monitor 107, the keyboard 110, and the pointing device 109 provide an interface between the computer 106 and the user. Specifically, the monitor 107 presents a graphic display of signals generated by the computer 106, while the keyboard 110 and pointing device 109 convert typed messages and position signals into computer-readable form.

The illustrated computer 106 includes functional units comprising an i/o controller 103, a microprocessor-based central processing unit 104, and a (random access) memory unit 105. The i/o controller 103 is an interface between the computer 106 and its peripheral units. The central processor 104 serves as the primary source of control, arithmetic, and logic operations within the computer 106. Further, the memory unit 105 provides volatile, rapid-access storage for the computer 106, particularly for the central processing unit 104.

An external PCMCIA adapter or socket 112 permits PCMCIA components to be inserted in the computer 106 in the conventional manner.

The illustrated hardware used for practice of the invention can be selected from any one of many commercially available programmable digital computers. As described below, the illustrated embodiment operates on an "IBM-compatible" personal computer utilizing a 386-class microprocessor, i.e., a microprocessor with an architecture based on that of the Intel 80386, Intel 80486 or Pentium™ microprocessors. The illustrated embodiment also operates with the Windows™ 95 operating system available from Microsoft Corporation.

1. Monarch Overview

The Monarch enhancements to Windows™ 95 are designed to be cooperative with the PCMCIA support built into that operating system. This approach allows users of the new operating system access to Windows™ 95 Plug and Play support for both protected mode and real mode clients.

The illustrated embodiment, hereinafter referred to as "Monarch," is composed of many software components, including real mode card and socket services, and Windows™ VxDs that execute on the computer 106. In addition to the discussion below, an understanding of Monarch may be attained by reference to the PCMCIA and PC CARD Standards (see, for example, Mori, *The PCMCIA Developer's Guide*, infra).

1.1 PCMCIA in Windows™ 95

Windows™ 95 PCMCIA support is derived from the PCMCIA standard. The main components of Microsoft's Windows™ 95 solution are Card Services and (per adapter) Socket Services. The Card Services implementation is PCCARD.VXD, which is a 32-bit protected mode device driver. Socket Services are also 32-bit protected mode device drivers. The interface between PCCARD and the socket services drivers are a subset of the PCMCIA version2.1 Socket Services API.

Microsoft has extended PCCARD to support their Plug and Play mechanism. In doing so, they have folded card identification functions into the PCCARD module. It is PCCARD's responsibility to identify cards and to load plug and play drivers for cards once they have been identified. In the parlance of Plug and Play, PCCARD is the bus enumerator for the PCMCIA bus. Note that while it is possible to write protected mode PCMCIA clients, the preferred mechanism for handling PCMCIA cards is to use Plug and Play drivers.

Windows™ 95 does not directly support real mode PCMCIA clients, although its architecture does allow real mode device drivers to operate. Monarch's main role is to extend Windows™ 95 PCMCIA support so that real mode and protected mode PCMCIA components can work cooperatively.

1.2 Basic Monarch Design

While PCCARD is the central component of PCMCIA support in Windows™ 95, enhancing that support requires building a network of software components around PCCARD to usurp some of its control over PCMCIA. The Monarch design modifies the normal processing on card insertion so that Monarch can make decisions about how to process a newly inserted card. Depending upon the card and the current system configuration, Monarch may route processing of the card to real mode CardSoft components or it may do some preprocessing to change the system configuration before PCCARD is allowed to gain access to the real hardware status.

As used herein, "CardSoft" represents a standard peripheral device service subsystem, including components such as Card Services and Socket Services as defined by the PCCARD Standard. The design and operation of such components is well known in the art. CardSoft itself is a trademark of SystemSoft.

This technique is made possible by the PCMCIA architecture, which requires Card Services to access the socket adapter through the socket services layer. Monarch exploits this dependency by adding functionality to the Socket Services GetStatus call. GetStatus serves as the hook upon which Monarch rests.

1.3 Monarch Software Modules

Figure 2:
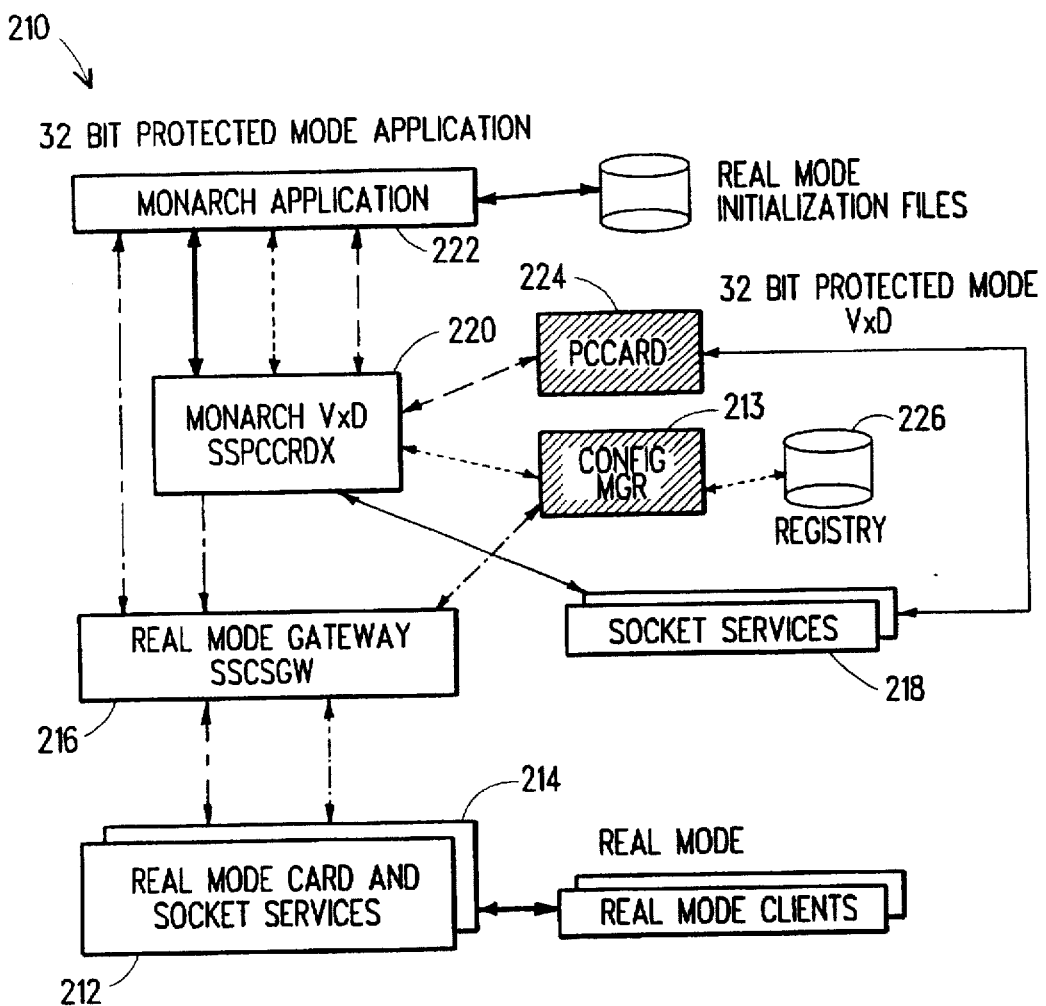
FIG. 2 illustrates an apparatus according to the invention for controlling, and communicating with, peripheral devices via protected-mode and real-mode clients.

Monarch is composed of a modified real mode version of Card Services, Socket Services VxDs for supported adapters, and two additional new VxDs. FIG. 2 depicts the major Monarch components and the control flow between them.

The following list summarizes the components of Monarch 210:

Real mode Card Services 212—A modified version of the conventional real mode card services. Card Services modifications include adding a mechanism to allocate resources from the Windows™ 95 Configuration Manager 213, adding a mechanism for handling card insertion when protected mode components are operational, and adding hooks to block access to sockets that have been configured for protected mode use.

Real mode Socket Services 214 for supported adapters—Largely unmodified versions of conventional real mode socket services are used in Monarch. The drivers operate whenever real mode CardSoft is in control of a PCMCIA slot.

Real mode CardID (not shown)—A slightly modified version of a conventional card identification module. CardID is required to communicate with the new Card Services Gateway VxD (see below).

Card Services Gateway VxD 216—A new VxD to interface between real mode and protected mode. This VxD is loaded by Card Services at Windows™ startup. It processes resource allocation requests from Card Services and maps protected mode PCMCIA calls to real mode.

Protected Mode Socket Services 218 for supported adapters—A protected mode version of socket services with Monarch specific enhancements. In addition to handling "generic" socket services calls, it extends processing of the GetStatus socket services call so that Monarch components get control on card insertion.

Monarch VxD 220—This VxD is an extension of the PCCARD, or as used elsewhere herein, SSPCCRDX.VXD and as an extension of the higher-level interface layer. A new VxD to handle the coordination of real mode and protected mode PCMCIA components. This module also provides services for the Monarch application to access Windows™ 95 protected mode components.

Monarch Application 222—A 32-bit protected mode application that provides user interface functionality similar to that provided by the CardWizard product commerically available from the assignee hereof.

The real mode PCMCIA interface is used by the Monarch application to gain access to the state of the real mode software and for control functions. These functions are similar to the current CardSoft interfaces, and will follow current implementations. The real mode PCMCIA interface is also used by Monarch's VxD to invoke control functions in the real mode subsystem. These control functions are implemented by adding vendor specific calls to Card Services to perform particular functions.

The two of the three interfaces between Monarch's application and VxD define "helper services" that the VxD provides to the application layer. These services provide access to the Windows™ 95 configuration manager and to PCCARD 224, neither of which may be directly accessed by a 32-bit application. For these interfaces, the VxD provides 32-bit IOCTL calls which are then rerouted to the appropriate VxD.

The third interface between the application and the VxD is for event notification and internal Monarch control. The VxD uses this interface when the application is required to perform some processing to handle card configuration and to configure operational parameters of the Monarch VxD. This interface is also implemented via a combination of an IOCTL call and Windows™ application messages.

The Monarch VxD itself uses the Configuration Manager to access the Windows™ 95 registry 226 and perform system control functions. This interface allows Monarch to modify the core Windows™ 95 Plug and Play environment and to indirectly control the behavior of PCCARD.

The interfaces to Socket Services are between PCCARD and the Monarch VxD. Windows™ 95 defines the PCCARD interface to be a subset of the PCMCIA standard interface, however, Monarch extends this interface in order to gain control of PCMCIA processing. As was mentioned above, the extension is used to subvert the normal PCCARD control flow on the PCMCIA GetStatus call.

The final interface on the diagram is between real mode Card Services and the gateway VxD. The gateway VxD is responsible for interacting with the Windows™ 95 configuration manager and coordinates resource allocation between Windows™ 95 and real mode components.

1.4 Monarch Initialization

Monarch becomes active in stages. Some Monarch components are responsible for starting other components, so that the startup processing is a chain reaction. The first Monarch component to start-up are the real mode components. If the system is configured to load real mode CardSoft, it will be loaded in config.sys in the same manner as it is conventionally loaded. Real mode CardSoft monitors the Windows™ startup broadcast, and requests the gateway VxD to be loaded when Windows™ 95 is detected. Real mode CardID also monitors the Windows™ startup, and establishes its own link to SSCSGW 216 for configuration of generic devices (modems).

If the system is configured for protected mode operation, PCCARD automatically loads the Monarch Socket Services. This dynamically loadable VxD loads the Monarch VxD during its initialization. The Monarch VxD and Socket Services establish a communications channel at this time. The initial handshake between these components also establishes a connection to real mode CardSoft if it is loaded.

The Monarch application 222 can be loaded in several ways. The user can explicitly load the application, the application may be loaded by Windows™ 95 at startup, or the Monarch VxD may be configured to load the application as needed.

1.5 Card Insertion Processing

Card insertion processing is a salient feature of Monarch. Most of the modules shown FIG. 2 are involved in some portion of servicing a PCMCIA card insertion.

PCCARD 224 calls socket services GetStatus in order to obtain socket state when a card is inserted. This call gives Monarch a thread of control in which to operate. When Socket Services 218 processes the call from PCCARD, Monarch must decide whether to return the true status of the socket 112, or whether to return an artificial socket empty. It will do the latter when the newly inserted card is to be handled by a real mode driver.

The initial decision on whether real mode or protected mode drivers are required for the card is made by the Monarch VxD 220. Socket Services calls into SSPCCRDX 220, which identifies the card by reading the CIS. The Monarch VxD initially looks for the card in the Windows™ 95 registry 226, which contains a record of all cards previously inserted in the system. At this point, one of the following three conditions will be true:

The card will be listed in the registry 226 and the Monarch VxD 220 will determine that a protected mode driver is available.

The card will be listed in the registry 226 and the Monarch VxD 220 will determine that a real mode driver should be used.

The card will not be listed in the registry 226.

In the first case, the Monarch VxD 220 will immediately return to Socket Services 218 with a value indicating that PCCARD 224 should be allowed to see the card. In the second case, the VxD 220 will return with an indication that PCCARD 224 should not be allowed to see the card and that the socket is empty. The Monarch VxD 220 will then invoke a vendor specific function in real mode Card Services 212 to configure the card.

If the card is not listed in the registry 226, the Monarch VxD 220 and the Monarch application 222 determine how the card should be configured. The thread of control which was initiated with PCCARD's GetStatus call will be quickly dismissed by the Monarch VxD 220 returning to Socket Services 218 with an artificial socket empty. Socket Services will return to PCCARD 224 indicating that the socket 112 is empty.

The application level software 222 then processes the card's PnP device ID and determine the proper routing for the card based upon what drivers are available. This configuration is written to the Windows™ 95 registry 226. Once the configuration method has been determined, Monarch will cause the appropriate software to get control of the card. This may require PCCARD to re-enumerate the PCMCIA bus under Monarch control.

Figure 3:
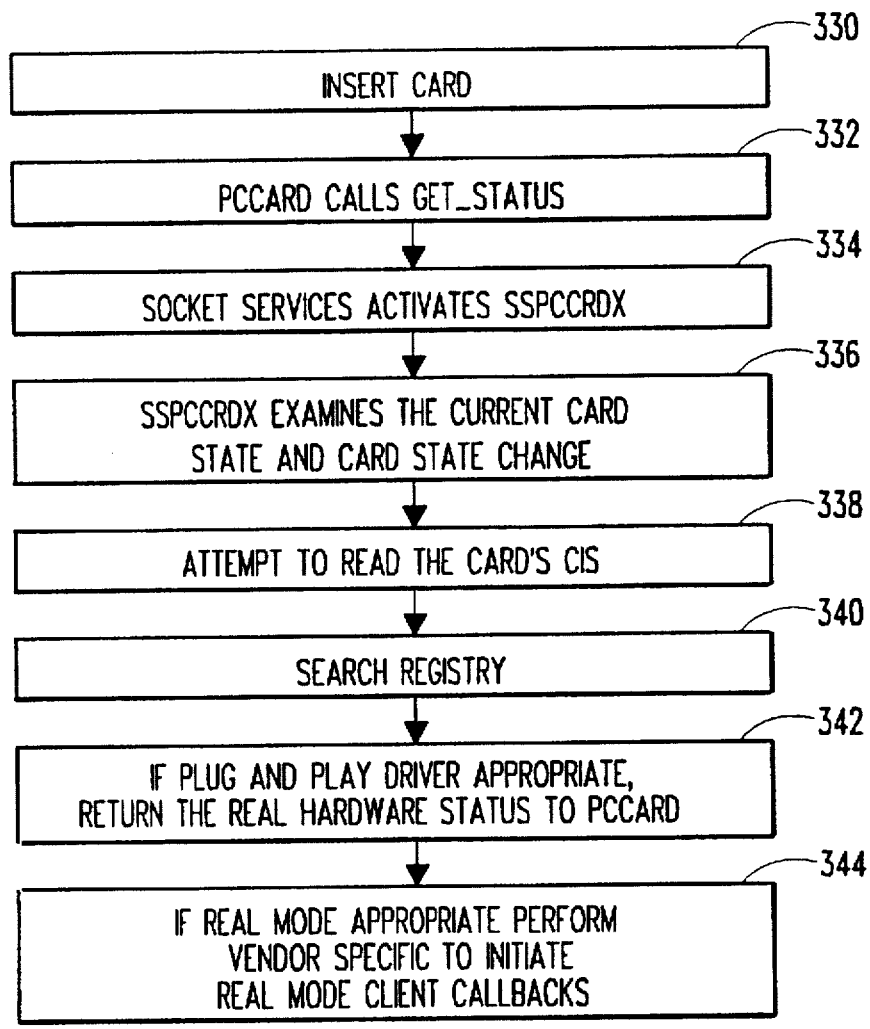
FIG. 3 is a flow chart depicting operation of the apparatus of FIG. 1B.

The card insertion processing of the Monarch VxD is a salient aspect of the embodiment. The Monarch VxD is activated by Socket Services calling Monarch Get Status during PCMCIA card insertion processing. See steps 330 and 332 of FIG. 3. It is important to remember that the Monarch VxD is being called in the context of Socket Services GetStatus processing, which is invoked whenever a card status change occurs. This section will describe the card insertion processing in detail.

SSPCCRDX GetStatus service is invoked by Monarch Socket Services whenever PCCARD calls for status. Step 334. SSPCCRDX examines the current card state and card state change provided by Socket Services to determine if the card is newly inserted. Step 336. If a card insertion has occurred, it attempts to read the CIS to determine a Plug and Play device identifier for the card. Step 338. Note that this may require SSPCCRDX to defer processing of the card insertion until the card comes ready. The SSPCCRDX relies on PCCARD polling for card ready, since the latter VxD is required to wait for the card to become ready as well.

1.5.1 CIS Processing

The first task of the Monarch VxD is to open a memory Window on the card and search for the tuples required to create a PCMCIA device identifier from the tuples. The tuples are described in the PNP.DOC, and are summarized below:

CISTPL_CFTABLE_ENTRY
CISTPL_CONFIG
CISTPL_DEVICE
CISTPL_MANFID
CISTPL_VERS_1

If there is an insufficient CIS and no proper device identifier can be created, the Monarch VxD will automatically assume that the device is a candidate for real mode device drivers. In the usual case, the VxD will be able to create a proper device identifier, and can perform driver search using the device ID as a key.

1.5.2 Registry Search and Extended Processing

Having obtained the device identifier, the registry can be searched for a matching entry. Step 340. There are two kinds of entries possible. One is a standard PCMCIA device identifier as described in the DDK documentation. The other is a tree located under the software branch of the registry, which is defined as the constant SS_REG_CARDLIB.

SSPCCRDX is only concerned with the software branch, and defers processing of the standard Microsoft PCMCIA branch to the application. If SSPCCRDX does not find the card's device identifier under the software branch, it sends a first insertion message to the Monarch application. If the device ID is found in the registry, SSPCCRDX looks at the State subkey for information about whether the card should be configured by real-mode or protect mode PCMCIA components.

Data in the SystemSoft directory may provide extended the information about the card. For example, a multi-voltage card may have the voltage selection specified in the SystemSoft portion of the registry. It is also possible that a SystemSoft registry entry will instruct Monarch to override the use of a protected mode driver specified in the PCMCIA section. State is a DWORD bitmask with the same values as defined for Get Socket State.

When SSPCCRDX determines that a Plug and Play driver should be used, it will return the real hardware status to Socket Services, which will return the status to PCCARD. Step 342. The Monarch VxD will then inform real mode Card Services that the socket has been allocated to protected mode.

If the SystemSoft proprietary entry is found, and that entry directs the processing of the card to real mode, the Monarch VxD will perform vendor specific calls into Card Services that will initiate real mode client callbacks. Step 344. This is the default behavior for cards which do not have a valid CIS. When a card is directed to real mode, SSPCCRDX manipulates the card status returns so that PCCARD believes the card has been removed from the system.

If no registry entry is found, then the card has most likely never been inserted into the system before. Complete processing of a newly inserted card is beyond the scope of the Monarch VxD. As was mentioned above, responsibility for the card is passed to the application via a Windows™ message. SSPCCRDX must return control to Socket Services and cause GetStatus to return to PCCARD with a status indicating an empty socket. The Monarch VxD marks the card as pending and waits for the application to update the registry with a SystemSoft entry.

Card insertion processing continues in the application. If the application has not been started, the VxD will optionally load the application. Once the application determines the best routing for the card and enters the card into the SystemSoft branch of the registry, it will inform SSPCCRDX by calling Set Socket State.

2. Card Services Modifications

Monarch depends on Card Services for all access to the real mode PCMCIA subsystem. Real mode Card Services is optional, in that the rest of Monarch components will be active even if Card Services is not loaded. However, when Card Services is to be used it will be loaded at system boot via config.sys. This means that Card Services will be active before Windows™ 95 loads, and that cards can be configured in real mode with associated real mode client drivers loaded before protected mode components become active. Note that modem cards are not be configured in real mode before Windows™ starts in order to prevent their being detected by the Windows™ hardware detection code.

2.1 Windows™ Startup

Card Services Int 2F processing loads the real mode gateway VxD on Windows™ startup. The code checks the Windows™ version information. If the Windows™ version is greater than or equal to 4.0, the virtual device file pointer in the Int 2F packet is set to point to "SSCSGW.VXD", which is the registered name of the Card Services gateway.

In addition, Card Services "freezes" its state on the Windows™ startup broadcast. No card insertion events or removal events are to be processed until Monarch invokes the Set Allocation Callback vendor specific function described below.

2.2 Vendor Specific Functions

Several vendor specific Card Services extensions control the processing of real mode Card Services running under Monarch. This section describes each of the calls, which are accessed via the standard PCMCIA Int 1A mechanism. The parameters for these calls are packed into vendor specific argument packets by the caller.

2.1.1 Simulate Status Change

This function is invoked when Monarch needs to reflect a status change event to real mode Card Services. For example, Card Services will be required to process a card insertion when a card is to be configured in real mode. In this case, the adapter status change will be detected by protected mode Socket Services and the Monarch software will invoke this function to inform the real mode components of the card insertion. The status change mask reflects the socket state which has changed since the last invocation of this function.

FUNCTION:
Simulate Status Change
PARAMETERS:
INPUT WORD Logical Socket Number
INPUT WORD Status Change Mask
INPUT WORD Flags (Wait)
RETURN
Success, Invalid Logical Socket When processing this call, Card Services calls back all required clients. If the wait flag is set, Card Services does not return from the call until all clients have been called. In this case, the return value indicates whether a real mode client has configured the card.

This call will implicitly allocate the socket to real mode.

2.2.2 Allocate Socket

Monarch invokes this function with the protected mode flag set when protected mode drivers are using the specified socket. Card Services GetStatus function checks whether a socket has been allocated to protected mode before returning the actual socket status. If the socket is in use by protected mode components, Card Services simulates an empty socket to real mode clients.

When a card is removed from a socket, Monarch will invoke this function to clear the allocation of the socket to protected mode.

FUNCTION:
Allocate Socket
PARAMETERS:
INPUT WORD Logical Socket Number
INPUT WORD Flags (Protected Mode Socket)
RETURN:
Success, Invalid Logical Socket Card Services sets or clears an internal flag indicating the specified socket is use by Plug and Play drivers.

2.2.3 Set Allocation Callback

This function is invoked by the gateway VxD to provide Card Services with an entry point to call to allocate system resources (IRQs, I/O ports, and DMA channels) from the Windows™ 95 Configuration Manager. The services provided by the callback mimic the interface to the Windows™ 3.1 Intel Configuration Manager, so that Card Services will be able to use the same resource allocation scheme for both Windows™ 95 and Windows™ 3.1/DOS.

Note that UMB space does not need to be allocated via this mechanism because Card Service UMB space is allocated by excluding ranges with a memory manager such as EMM. In the future, however, CardBus may require allocation of memory resources.

This call has the side effect of signaling Card Services that Monarch has completed its initialization and is now in control of PCMCIA processing. Card Services will process any card removal that has occurred between the Int 2F broadcast and the invocation of this call, and use the supplied callback to free any resources which are no longer in use.

FUNCTION:
Set Allocation Callback
PARAMETERS:
INPUT DWORD Allocation Callback Address
INPUT DWORD Flags (Slave Mode, Polled Mode)
RETURN:
None If either the enable slave mode flag or enable polled mode flags are set, Card Services will disable its IRQ usage. This may involve setting internal state flags as well as interfacing to the PIC and MSDOS to remove existing interrupt handlers.

SSCSGW will determine the appropriate mode for Card Services (slave mode, polled mode, or interrupt mode) before invoking this call and set the flags parameter appropriately.

3. Real Mode Gateway

The real mode gateway is a VxD derived from the current SSVRDD. While it has significant differences from the current driver, many of the functions are related. The application interface for the gateway VxD is a 32-bit IOCTL function, which is the only way to provide an interface between a 32-bit Windows™ applications and a Windows™ 95 VxD. PCMCIA callbacks are handled by Windows™ messages rather than standard callback entry points. SSC-SGW will also provide a 32 bit flat mode service API for other VxDs. It supports multiple Windows™ 95 applications, but will not support 16-bit Windows™ applications.

One of the major responsibilities of the gateway is to handle resource allocation on behalf of real mode Card Services. It provides Card Services with a V86 callback address to use to call into Windows™ 95 and allocate and free system resources.

3.1 IOCTL API

The gateway IOCTL API is intended for 32-bit applications to access the real mode card services API. This VxD will conform the IOCTL protocol of Windows™ 95, and will provide one Monarch-specific IOCTL function. This IOCTL is the real mode Card Services entry point for 32-bit Windows™ applications. All Card Services PCMCIA calls are vectored through the SS_IOCTL_CALLCS function.

3.1.1 General PCMCIA Call Binding

The PCMCIA standard defines a binding for Card Services calls and callbacks. This binding is not appropriate for 32-bit IOCTL calls, because callbacks from VxDs to 32-bit applications are not supported under Windows™ 95. Monarch will use a proprietary binding based on data structures passed to the SS_IOCTL_CALLCS IOCTL function.

The structure will contain the following fields:
FUNCTION:
Call Card Services
PARAMETERS:
WORD Function
WORD Handle
WORD ArgLength
BYTE ArgBuffer[ArgLength]
RETURN:
Card Services Return Value, Card Services Unavailable Most Card Services calls are mapped by moving the data from the IOCTL packet to the appropriate registers and executing an Int 1A to call Card Services. Data in the ArgBuffer is copied to V86 accessible buffers.

If the card services call returns a handle, that data will overwrite the input handle specified in the IOCTL packet. Return argument data will overwrite the input ArgBuffer, which is consistent with the PCMCIA standard specification.

The VxD IOCTL call will return the PCMCIA call status in the return buffer specified in the IOCTL packet. If the return buffer byte count is not at least 2 bytes the status will not be returned. The return byte count of the IOCTL packet to reflect the actual number of bytes copied to the return buffer.

This call format will not handle Card Services calls which contain a "pointer" argument. The only relevant call which contains such an argument is Register Client, which will be handled specially (see below). In general, calls which pass pointers are handled on an as needed basis and will require processing specific to the semantics of the call.

3.1.2 Card Services Registration

The card services registration call is modified from the PCMCIA standard in order to better integrate with the Windows™ environment. The gateway VxD accepts an extended version of the standard Card Services call to handle client registration. The extensions provide a way for the VxD to post a message directly to the applications window procedure, with parameters supplied by the calling application. The IOCTL packet for Register Client are defined as follows:

FUNCTION:
Card Services Register Client
PARAMETERS:
WORD Function (Register Client)
WORD Attributes
WORD Event Mask
WORD Version
WORD pad
DWORD Window
WORD Message
WORD pad
DWORD lParam
WORD ClientData Size
BYTE Client Data [Client Data Size]
RETURN:
Card Services Return Value, Card Services Unavailable The first two parameters are identical to the "generic" PCMCIA calls. The third, fourth, and fifth parameters contain the PCMCIA register client data as defined in the PCMCIA specification. The remainder of the parameters are Windows™ 95 specific.

The sixth parameter specifies the window which is to receive callback messages, the seventh parameter is the Windows™ message which should be posted upon receipt of a callback. The eight parameter is the value which the VxD will place as the lParam on the Windows™ message. The final parameters contain callback data which the VxD will use to reply to CLIENT_INFO callbacks on behalf of the registering client.

The VxD allocates buffer space for the client information upon invocation of the register client IOCTL and the relevant data is copied to the buffer. The address of this buffer is passed to Card Services as the client data field of the Register Client function. A V86 callback entry is supplied as the Card Services callback. The other data is formatted as specified in the PCMCIA specification for client registration. The VxD invokes Card Services via Int 1A, and stores the return Card Services client handle with the other client data.

The VxD also stores the process tag of the calling process which is passed to the driver in the IOCTL call.

3.1.3 Callback Processing

Callback processing under Monarch uses the data passed to the gateway VxD to post messages Windows™ to the client application. The gateway first preprocesses the callback to determine if it is one of the callbacks which is not supported for Monarch applications (insertion, ejection, exclusive, or reset request) or is a CLIENT_INFO callback, which the VxD handles internally from data supplied at client registration.

If the callback requires a message to be posted to the client, the VxD formats the message according to the data supplied at client registration. The high byte of the wParam parameter of the message will contain the Card Services callback event specifier. The low byte of the wParam will contain the socket on which the event occurred.

3.1.4 Close Handle

Windows™ 95 calls the IOCTL close handle function when the connection between the application and the device is terminated. The gateway performs any required clean-up of the client on invocation of this function. The clean-up includes deregistration of the client from card services and freeing memory resources allocated on behalf of the client.

3.2 VxD Service API

The gateway VxD provides VxD services to allow ring 0 components access to real mode card services. This interface is based on the register based interface described in the PCMCIA standard and on the current code in SSVRDD. The gateway provides buffer translations between real mode and protected mode components.

3.3 Resource Allocation

Resource allocation is a shared responsibility between Card Services and the gateway VxD. Card Services is operational before Windows™ 95 and the gateway VxD load, and it is initially responsible for allocating resources for cards configured in real mode. After Windows™ 95 loads, the initially allocated resources will be inquired by the gateway, and subsequent resource allocation will be made cooperatively between Card Services and the gateway VxD.

3.3.1 Windows™ Startup

The gateway uses standard Card Services calls to inquire about resources in use by Card Services during device initialization. It then allocates the resources from the Windows™ 95 configuration manager to account for the resources in use. Finally, the device allocates a V86 callback and invokes the vendor specific Card Services call SetAllocationCallback to inform card services of the entry point to use for dynamic resource allocation.

3.3.2 Dynamic Resource Allocation

Resource allocation after Windows™ is running is performed through the entry point provided by the gateway to Card Services. Card Services will call this entry point to query free resources, allocate resources, and free resources no longer needed.

The interface between Card Services and SSCSGW is based upon the interface that exists in the current CardSoft between the Intel Configuration Manager and Card Services.

4. Monarch VxD

The Monarch VxD is the VxD agent of the Monarch application, and is responsible for the first level decision on how a PCMCIA card should be supported. It also provides services for the Monarch application to interface to Windows™ 95 VxDs which do not have IOCTL interfaces defined.

4.1 Socket Services Support

The Monarch VxD encapsulates the extended GetStatus processing which Monarch provides in a modular fashion. While Socket Services is in control of the adapter hardware, the Monarch VxD is responsible for deciding how the hardware is used.

4.1.1 Register Socket Services Control Message

This interface is used by Socket Services when Windows™ 95 initializes. Socket Services loads the Monarch VxD and sends a directed system control message SS_REGISTER_SS to the Monarch VxD. Note that the VxD needs to be able to support the registration of multiple socket services in case multiple socket services drivers are required. The interface for this call is register based, as described below:

FUNCTION:
Register Socket Services
PARAMETERS:
INPUT EAX Registration Message
INPUT EDX Socket Services Entry Point
INPUT EBX Pointer to Adapter Data Structure
OUTPUT ESI Pointer to Location to Receive Monarch Entry Point RETURN:
Success In response to this message, the Monarch VxD stores the Socket Services entry point and the pointer to the adapter data structure. Note that a field is required in the adapter data structure for Monarch specific data.

The return function is the entry point Socket Services uses to access functions inside the Monarch VxD. This entry point is a function dispatch, similar to the Socket Services entry, but it is 'C' based with parameter passed on the stack. The first parameter is always the function to be invoked, the second a pointer to the adapter data structure, and the third parameter is a function specific data.

In response to this message, SSPCCRDX determines if real mode PCMCIA components are loaded. If real mode CardSoft is available, SSPCCRDX invokes GetStatus and VS_Get_CS_Status to determine the state of the socket and any cards which may have been in the system at boot. This information will be stored for later inquiry by the Socket Services VxD.

4.1.2 Report Real Mode Socket Use

This call is made by Socket Services to query the real mode socket status. The call is made to the entry point returned on the Register Socket Services call.
FUNCTION:
Report Real Mode Socket Use
PARAMETERS:
INPUT DWORD Function
INPUT Pointer to Adapter Data Structure
INPUT DWORD Null
RETURN:
Socket Usage Bitmask The low word of the socket bitmask is indicates sockets in use by real mode. The low order bit of the upper word of the socket bitmask is set to indicate the presence of real mode socket services.

4.1.3 Monarch Get Status

The entry point is called by Socket Services when PCCARD invokes GetStatus. Socket services uses this function to invoke Monarch PCMCIA extensions.
FUNCTION:
Monarch Get Status
PARAMETERS:
INPUT DWORD Function
INPUT Pointer to Adapter Data Structure
INOUT Pointer to Get Status Structure (Socket, Hardware Status, Status Change)
RETURN:
Invalid Socket, Success The Get Status structure contains both the current hardware status and the status change mask for the specified socket. The status change mask specifies which bits have changed in the hardware status, and are similar to the "latched" socket state bits in the PCMCIA specification.

SSPCCRDX filters the hardware status and status change masks and returns them in the Get Status structure. It is Socket Services responsibility to adjust the "latched" adapter data to correspond to the return values provided by the Monarch VxD. Socket Services clears its internal copy of the status change mask on invocation of this call.

4.1.4 Monarch Deregister Socket Services

The entry point is called by Socket Services when it is being unloaded from the system. For example, Windows™ 95 will unload a VxDs when a portable computer is removed from its docking station.
FUNCTION:
Monarch Deregister Socket Services
PARAMETERS:
INPUT DWORD Function
INPUT Pointer to Socket Data Structure
INPUT NULL
RETURN:
Success, Not Registered It is Socket Services responsibility to call this function when it receives a CONFIG_REMOVE Plug and Play Message.

4.2 PCMCIA Interface Support

The interface between the Monarch VxD and PCCARD is similar to the interface between the gateway VxD and real mode card services, since the PCMCIA functionality is equivalent. The interface through the Monarch VxD will be an IOCTL interface with identical call bindings to the bindings described in the gateway VxD section.

4.2.1 PCMCIA Call Processing

The processing of PCMCIA in the Monarch VxD calls differs from the processing described in the real mode gateway in that PCCARD is a VxD using the same address space as the Monarch VxD, therefore buffer translations are not needed. PCCARD is invoked through a VxD service. The general PCMCIA processing algorithm is to setup the registers according to the PCMCIA specification and invoke the PCCARD Card Services entry point. Note that since no buffers need to be copied, the input argument buffer will be overwritten regardless of how the output buffer of the IOCTL packet is setup.

4.2.2 PCMCIA Registration

Again, the registration call for the Monarch VxD is similar to that of the gateway calling real mode Card Services. The Monarch VxD will store the client data in local storage to allow asynchronous processing of the GetClientInfo callback.

4.2.3 Other PCMCIA processing

The Monarch VxD parallels the gateway in its processing of the PCMCIA callback functions and the close handle IOCTL.

4.3 Configuration Manager Support

The configuration manager interface allows the Monarch application access to the internals of the Windows™ 95 Plug and Play architecture. This interface is best thought of as an application extension to allow it access to the configuration management functions defined by Microsoft. A 32-bit Windows™ application cannot access the Configuration Manager directly.

The interface between the configuration manager and Monarch is augmented by .inf files which coerce Windows™ into loading device drivers required for Plug and Play of PCMCIA cards.

The configuration manager uses .inf files to process new devices as they are added to the system. These files contain information about resources devices use, and drivers that are required for device operation. The .inf files are used to configure generic cards, such as modems. Monarch components access these .inf files by creating device nodes which have identifiers corresponding to those defined in the .inf files.

The resource usage calls provide application access to information about what system resources are being used so that the application can determine better PCMCIA card configurations. This interface is required because PCCARD does not support AdjustResourceInfo.

4.3.1 Device Node Creation

The device node is the software structure which represents hardware present in a Windows™ 95 system. Monarch creates device nodes to inform the operating system of changes to hardware state. The creation of device nodes will cause device drivers to be installed and loaded, and will make other Plug and Play drivers aware of new hardware.
FUNCTION:
Create Device Node
PARAMETERS:
INPUT WORD Function
INPUT DWORD Parent (or Null)
INPUT WORD Size
INPUT BYTE|Size| Device ID
RETURN:
Device Node Handle, Failure The VxD creates the device node with the specified parent and device identifier. This call returns a handle to the device node created, so that the application has full control over the device node tree. If the parent is NULL, the VxD creates a device node from the root.

4.3.2 Get IRQ Usage

This function provides an interface to the IRQ arbitrator's IRQ in-use data.
FUNCTION:
Get IRQ Usage
PARAMETERS:
INPUT WORD Function
OUTPUT IRQ_Arb_s (as defined in CONFIGMG.H)
RETURN:
None 4.3.3 Get DMA Usage This function provides an interface to the DMA arbitrator DMA in-use data.
FUNCTION:
Get DMA Usage
PARAMETERS:
INPUT WORD Function
OUTPUT WORD DMA alloc
RETURN:
None 4.3.4 Get IO Range Size This function provides an interface to the IO arbitrator IO in-use data. The Monarch VxD will compute the size of the return buffer required to report IO use to the application. Note that this information is volatile and may change at any time. The application should consider this value to be the minimum buffer size for Get IO Data (below).
FUNCTION:
Get IO Range Size
PARAMETERS:
INPUT WORD Function
OUTPUT WORD Size
RETURN:
None 4.3.5 Get IO Data This function provides an interface for the application to retrieve the in-use IO data from the IO arbitrator. If the status indicates that the buffer is to small, the application should reissue the call with a larger buffer.
FUNCTION:
Get IO Data
PARAMETERS:
INPUT WORD Function
OUTPUT WORD Status (Success, Buffer to Small)
OUTPUT WORD NumRanges
OUTPUT DWORD Ranges[NumRanges]
RETURN:
None IO Ranges are returned as two WORD pairs indicting the start of the range and the end of the range.

4.4 Application Support

The Monarch application and the Monarch VxD cooperate with shared responsibilities for card insertion processing. This section describes the control interface that the application uses to coordinate with the Monarch VxD. Like the other application interfaces, it is a 32-bit IOCTL (SS_IOCTL_MONARCH_CONTROL).

4.4.1 Monarch Register

The application must register with Monarch in order to receive a Monarch event indicating that the application must perform some work to handle configuration of a newly inserted card. This call is conceptually similar to registering as a PCMCIA client, however, it is required because some of Monarch's processing is performed outside the pervue of either PCMCIA card services.
FUNCTION:
Monarch Register
PARAMETERS:
INPUT WORD Function
DWORD Window
WORD Message (First Insertion, Card Insertion)
DWORD lParam The interface to this call reflects the application interface for PCMCIA. When required, the Monarch VxD will post a message to the specified window. The wParam passed in the message will indicate the socket on which the event occurred. A first insertion message is sent when a card is inserted and the SystemSoft branch of the registry does not contain an entry for the card. A card insertion message is sent when a card is inserted and the card is found in the software branch portion of the registry.

4.4.2 Get Socket State

The application can inquire the current state of the Monarch VxD and Monarch supported sockets. Note that sockets may appear to be empty through either the PCCARD or real mode Card Services interface, even though a card is present.
FUNCTION:
Get Socket State
PARAMETERS:
INPUT WORD Function
INPUT WORD Socket
RETURN:
Socket State Bitmask (Empty, Pending, Real Mode Driver, PnP Driver, Stopped, Unpowered, Low Voltage, Waiting Ready)

The Monarch VxD tracks the state of the sockets as cards are inserted, removed, and assigned to various components. This call returns a bitmask describing the current socket state to the application.

4.4.3 Set Socket State

This function allows the application to communicate new state information to the Monarch VxD. Since the application and the VxD cooperate in the processing of cards, the application must inform the VxD of card state changes which happen at the application level.
FUNCTION:
Set Socket State
PARAMETERS:
INPUT WORD Function
INPUT WORD Socket
INPUT WORD State (Enumerated State Values)
RETURN:
Success, Invalid State, Invalid Operation This call sets the internal state of the Monarch VxD and may additionally cause SSPCCRDX to perform actions on behalf of the calling application. The valid values for state, and the actions performed, are as follows:

Stop—SSPCCRDX will ask the configuration manager to stop the device. This function should be invoked before a socket is powered off.

Start—SSPCCRDX will cause the system to resume using a stopped device. This call will cause power to be applied if the socket is powered off.

Lower Voltage—The card will be set to use 3.3 volts (VCC) if possible.

Raise Voltage—The card will be set to use normal voltage (VCC).

Power Off—The socket will be powered off.

Clear Pending—The pending state of the socket will be reset.

These calls require SSPCCRDX to invoke vendor specific extensions to Socket Services which are defined for Monarch Socket Services. Certain functions may not be supported by target hardware. SSPCCRDX inquires Socket Services capabilities by using the vendor specific call defined for that purpose.

Note that application will invoke Set Socket State to clear the socket pending status only after modifying the Windows™ 95 registry. In effect, this call signals SSPCCRDX to process the new registry entry. The VxD is responsible for interfacing to the correct Card Services (real mode or protected mode) to cause the card to be configured.

4.4.4 Get Device ID

A Plug and Play device ID uniquely identifies a card to the system. This call generates and returns the identifier for the card in the specified socket.

FUNCTION:
Get Device ID
PARAMETERS:
INPUT WORD Function
INPUT WORD Socket
OUTPUT Plug and Play Identifier for the card.
RETURN:
Success, Bad CIS, Socket Unavailable The Monarch VxD will process the tuples on the card and generate a Plug and Play identifier as described in PNP.DOC. The device identifier is returned in the output buffer specified in the IOCTL packet.

5. Socket Services Extensions

The Monarch socket services is customized from the PCMCIA standard to support Monarch. This section describes the Monarch specific extensions required.

5.1 Socket Services Initialization

Monarch Socket Services initialization code needs to be aware of the real mode components which may have configured cards before Windows™ transitioned into protected mode. In order to obtain this information, Socket Services dynamically loads the Monarch VxD and register with it. Socket Services can then inquire the state of the real mode components through the Monarch VxD. Sockets with configured cards will have their state preserved; sockets which do not have configured cards will be normally initialized.

5.2 GetStatus Extensions

Monarch Get Status processing has been explained in detail in previous sections. It is Socket Services responsibility to call the Monarch VxD when it receives a GetStatus call from PCCARD. Socket Services uses the status returned by the Monarch VxD as the return value to PCCARD.

5.3 Monarch Vendor Specific Extensions

The protected-mode Socket Services VendorSpecific call is organized into functional interface groups, similar to real-mode Card Services vendor specific calls. Each interface supports a generic "Get Capabilities" call and some number of interface-specific calls. One of these interface groups supports the Monarch VxD. Like the other Vendor-Specific interfaces, the Monarch functional group is an optional interface which depends on the OEM variation of Socket Services.

PCMCIA defines a call to the Socket Services entry point with AH=0xAE as a VendorSpeczfic call. Socket Services functions are defined as register based at the outermost level, but the illustrated implementation uses an underlying packet interface for vendor specific calls:

ENTRY PARAMETERS:
AH=SSFN_VENDOR_SPECIFIC (0xAE)
EBX=Interface Group (SSVSIF_MONARCH for Monarch interface)
EDX=Pointer to parameter packet
ESI=Pointer to internal Socket Services data
RETURN:
AH=R_SUCCESS (0) if successful, or a socket services failure code.

The EBX register is the interface selector value. If the most significant bit of this value is set, then the call may reenter Socket Services. Calls in the Monarch interface are allowed to reenter Socket Services so that they may work during GetStatus processing.

The function code for the call is contained in the packet pointed at by EDX. It is always the first word in the packet. The rest of the packet structure depends on this function code.

It is critical that the ESI register be set to the 32-bit "reference data" associated with the Socket Services device node (the Monarch VxD is passed this value when it receives the Register Socket Services message at startup). This is a pointer to instanced data.

5.3.1 Inquire Monarch Capabilities
Packet Structure:
INPUT WORD function code=SSVS_CAPS
INPUT WORD data size/buffer size
OUTPUT (variable size) capabilities flags This is the capabilities function that every interface group supports (the function code is the same for all interfaces). The size specifies how many bytes of flags the caller wants returned in the buffer (the caller should fill the buffer with zeros).

5.3.2 Enable/Map a CIS Window
Packet Structure:
INPUT WORD function code=SSVSPCX_MAPCIS
INPUT WORD socket number
INPUT WORD host start address (in 4K byte units)
INPUT WORD window size (in 4K byte units)
INPUT WORD card memory offset (in 4K byte units)
INPUT WORD flags (SSVS_MCF_ATTMEM set for attribute memory)

This call exists specifically for tuple processing. The caller specifies a socket index, host memory range, card offset, and common/attribute flags. 300 nanosecond memory timing is implicit. The card is assumed powered up and reset, so that its CIS is readable. The window used is the lowest-numbered window that can be assigned to the socket and can perform the desired mapping.

The hardware state to map the window is set without updating the memory cache of the hardware state that Socket Services maintains.

5.3.3 Free CIS Window
Packet Structure:
INPUT WORD function code=SSVSPCX_FREECIS
INPUT WORD socket number This restores a CIS window set by the Enable/Map a CIS Window call to the state it had before it was mapped. Socket Services does this by setting the windowing hardware to the state it has cached in RAM.

5.3.4 Simulate Status Change Interrupt

Packet Structure:

WORD function code=SSVSPCX_SSCI

WORD IN: socket services function code

This call does a ring 0 "int" instruction appropriate for the current status change IRQ. It also affects any calls to AckInterrupt during interrupt processing, returning the socket bits indicated in the wSocketMask parameter to the caller. If no status change IRQ is being used by the adapter (polled mode) then this function does nothing.

5.3.5 Get/Set Busy flag state

Placeholder. This is useful for holding PCCARD at bay.

5.3.6 Socket Power Off Control

Placeholder. This functionality can be accomplished via the Extended State vendor-specific interface.

5.3.7 Multi-voltage Support

Placeholder. This functionality can be accomplished via the Extended State vendor-specific interface.

6. Monarch Application

This section describes the interaction between the Monarch application and the other Monarch components.

6.1 Overview

The application comunicates with PCCARD, SSPCCRDX, as well as Real Mode Card Services. It registers as a memory client to both PCCARD and Card Services. It also registers with SSPCCRDX. The application calls several Card Services and PCCARD functions to identify cards and their configuration. When some of these functions fail, in the case of a PCCARD configured card, the application retrieves the information from the Windows™ registry. An example would be a modem card configured using Windows™ 95 modem driver. The application receives callbacks from all three modules when cards are inserted or removed. Any of these events forces the application to build its internal structures representing the state of the system components and resources.

The application does not require Card Services and PCCARD to be loaded at the same time. However, the application requires SSPCCRDX.

The application serves multiple purposes. Its acts as the Monarch user interface, Monarch card processing decision maker, and a card configuration problem solver as in Wizard features. It also performs user specified actions when cards are inserted. The application displays inserted card information such as, the card name and manufacturer name, the resources the card is using and the way it is configured. It also displays assigned COM ports for modem cards and drive letters for ATA and memory cards. A user can find out if the card is configured by PCCARD or by Real Mode Card Services. System resource information is provided by the application displaying the I/O, IRQ, and Memory resource use. The application also displays information about PCCARD, Real Mode Card Services , as well as, all their clients.

6.2 Application User Interface 6.2.1 Card Information View

Depending on the type of card, detailed information about the card is displayed. The view contains a list box that contains information about each card installed in a slot. The list box is set to show at least two slots at a time. If a machine contains more than two cards the user needs to scroll the listbox to view other cards. Additional card information is displayed when an item in the listbox is clicked on using the left mouse button. When a multifunction card is inserted, each list element will represent a function of the card. Card Information View contains the following:

bitmap representing the type of card

The name of the card extracted from the CIS or the Registry.

The manufacturers name of the card extracted from the CIS or the Registry.

The type of card inserted. If the card is configured using RM CS then the card type displays |Compatability Mode|

Available types are:

MODEM

NETWORK

ATA

FLASH

SRAM

IBM 3270 EMULATOR

OTHER

UNKNOWN

This bmp is used for both cards that are not configured and cards that are not recognized.

When a user request card properties the following information is displayed:

The I/O resource the card is using (when applicable)

The memory resource the card is using (when applicable)

The IRQ resource the card is using (when applicable)

The drive letter the card is allocating (when applicable)

The type of memory card inserted (when applicable)

The size of memory card inserted (when applicable)

The Card Information View also contains a button that launches the Wizard to investigate card problems.

The views serve two purposes, to display resource information and to edit Real Mode resource directives.

The application displays Memory, I/O, and IRQ resources in the PC with their allocation attributes and PCMCIA card owners. These resources are displayed in separate MDI windows with card attributes filters applied to the views. Three types of MDI windows exist. Namely; I/O View, Memory View, and IRQ View. Each window contains a listbox that displays the resource number or address and its use. Tabs filters the information to display Used, Free, Reserved, Included, and Excluded resources. The resource allocation displayed comes directly from Card Services. (Note that Reserved, Included, and Excluded apply to RM Card Services only.) Resource addresses or numbers are displayed within the list box together with their attributes. Attributes depend on the filter selected. The SYSTEM attribute represents all other resources not handled by Card Services. The Free represents all resources that are available for use by PCMCIA Cards.

Resource Views have the ability to edit Include, Exclude, and Reserve resources. When any of those tabs is selected a user can Add or Remove resources to the list. When a user adds or removes resources from any of the Include, Exclude, or Reserve list Card Services is immediately updated. In addition, CSALLOC.INI is also updated by adding items to the file using IRQINCLUDE, IRQEXCLUDE, RIRQ, IOINCLUDE, IOEXCLUDE, RIO, MEMINCLUDE, MEMEXCLUDE, and RMEM.

6.2.1.1 Module Information

The application displays all clients registered with Card Services and PCCARD. Information includes the client name, version, version date, Card Services version compliance, and manufacturers name. Note that modules that do not register with RM Card Services or PCCARD such as ATADRV.EXE or 32 bit clientswill not be displayed in the module list. SSPCCRDX and SSCSGW module information will also be displayed.

6.2.2 PCMCIA Events

The application provides a PCMCIA card user with useful information when cards are inserted in the system. In addition to beeping on card insertion and removal. The application acts on resource conflicts. At the minimum it informs the user of the existence of the conflict and provides "helper" information about them.

The application can be configured to act on events by launching applications or playing sound wave files.

6.2.2.1 Card Events

Insertion: A card is inserted into a slot and correctly configured by Card Services or PCCARD at a request of a "Card Services" client.

Removal: A card is removed from a slot.

Configuration Conflict: A card is inserted into a slot and could not be configured by Card Services at a request of a Card Services client due to lack of resources.

Unrecognized Card: A card is inserted into a slot and no Card Services client tried to configure this card.

6.2.2.2 Actions on Card Events

Notification Message: Brings up a message box event occurs

Application Launch: Launches an application when a particular card is inserted

Play Sound file: Plays one of four sound files depending the above listed events Beeps on can insertion or removal.

New_Card installation processing. The Monarch application processes new card insertion and aids the user in deciding whether the card will be supported by Windows™ 95 or Card Services

6.2.3 CardSoft Configuration

These functions are activated when RM Card Services is loaded.

6.2.3.1 Resources Allocation

This allows a user to change resource allocations maintained by CSALLOC in the CSALLOC.INI file. Resources can be included, excluded, or reserved. Resource allocation changes will take effect immediately without rebooting the PC.

6.2.3.2 General PCMCIA Card Configuration

A user can configure the general configuration parameters for mainstream cards, such as fax/modem, modem, network and ATA cards. The configuration parameters are accessed using the Settings sub menu. Almost all these parameters belong to CARDID. Changing them will update CARDID.INI as well as CARDID memory database.

6.2.4 The Application Configuration

The application several features can be configured by a user.

6.2.4.1 Notification

Popup card insertion and removal messages can be enabled or disabled. In addition, the messages can be automatically acknowledged instead of waiting for a user to press the OK button.

6.2.4.2 Views

A user can configure two card slot views to be displayed with the first slot on top or the last slot on top. Slot numbering can also be configured to start from zero or 1. The minimized view can be configured to always stay on top. An alternate method is to allow the user to assign friendly name to the slots, such as Top slot, Bottom Slot.

6.2.4.3 Sound

A user can associate four different sounds to four events. One of three occurs when the card is inserted, and the forth occurs when a card is removed. The first event occurs when a card is inserted into a slot and it is configured correctly. The second event occurs when a card is inserted into a slot and CardSoft was unable to allocate the requested resources to the card (not configured). The third event occurs when a card is inserted into a slot and CardSoft is unable to recognized the card.

6.2.4.4 Application Launch

A user can associate up to four different applications to any PCMCIA card inserted in a slot. When that particular card is inserted and configured. The Monarch application launches the specified application. A user can opt to have the Monarch application query the user for approval before launching the application upon card insertion.

Note that the Monarch application will only launch one instance of the application. If the application is already running and a user inserts the card. The Monarch application will bring the application to the foreground. The Monarch application uses the card name and card manufacturers name found in the CIS as a way to associate an application to a card.

The Monarch application does not close applications it launched. A user has to manually close these applications.

6.3 Application Startup

The application can either be started by the user or started by Monarch when the need arises. When the application starts, it runs several diagnostic checks before registering with PCCARD and RM Card Services. It also registers with SSPCCRDX. The application then calls Get Socket State to determine the installed card state for every card slot in the machine. It then builds a representation of the system by creating a system component and any installed PCMCIA card component. It disables some of its functions if Card Services is not installed.

The application builds its installed card representation by inquiring PCCARD and RM Card Services whether cards are installed and getting further information about the installed card.

Monarch starts the application when it needs help with processing first time card insertion. After the application is started, it calls Get Socket State to determine if an inserted card needs to be processed.

6.4 Card Insertion Processing

When cards are inserted Monarch attempts to recognize the cards by building a card ID and checking it against its registry entry. If the card has been processed previously, Monarch then allows PCCARD or RM Card Services to attempt to configure the card. If no Monarch registry entry is found, then Monarch sends the application a message to allow it to help in the card insertion decision making. Card insertion situations can be summarized into of the following categories:

The card is identified by Monarch and should be configured by PCCARD

The card is identified by Monarch and should be configured by RM Card Services

The card is identified by Monarch and should be configured by RM Card Services and RM Card Services is not loaded.

The card is not identified by Monarch, but has been previously installed as a PCCARD device.

The card is not identified by Monarch and is inserted for the first time.

Monarch determines the state of the card insertion and does not require the application's assistance in determining the card state. When it decides that the card will be configured by RM Card Services or PCCARD and both are installed the application need not be running.

6.4.1 Identified Card Insertion Processing

Whenever a card is inserted, SSPCCRDX looks in its registry entry to determine if it has processed this card before. It then uses the appropriate Card Services (RMCS or PCCARD).

6.4.1.1 Configured Card Insertion Processing

When a card is inserted and configured, the application receives a message from configuring module (PCCARD or RM Card Services). It then rebuilds its system representation. The application determines which entity configured the card and makes several calls to determine the card configuration when building the inserted card component representation. If the card is configured by RM Card Services it calls vendor specific functions to get more detailed information, such as the ATA drive letter. If the card was configured by PCCARD the application uses standard PCCARD function calls to build its information. In some cases, when the card is configured as a generic Windows™ 95 device, PCCARD will not respond to reading tuple information. The application will then get the card information from the registry.

6.4.1.2 Missing Modules

It is possible that at insertion, a previously inserted card was configured by RM Card Services it is currently not loaded. Monarch will send the application a missing module message, SS_MSG_RMCS_NOTLOADED. The application will then interact with the user to take appropriate action.

6.4.2 First time Card Insertion Processing

This situation occurs if Monarch does not find an entry for this card in the registry, informs the application. In some cases, the card does not have a device ID.

6.4.2.1 Cards with no Device ID

When a user plugs in a card, Monarch reads the cards CIS and creates a device ID. Some cards do not have the required fields in their CIS or any CIS information. In this case, Monarch defaults to RM Card Services. If RM Card Services is not loaded Monarch will send the application the SS_MSG_RMCS_NOTLOADED message. The application will then interact with the user to take appropriate action. If the user opts to load RM Card Services the application modifies the config.sys file to add the RM Card Services device driver and reboots the machine.

6.4.2.2 Cards with a Device ID

The application first checks to see if this card is in the PCCARD registry. If it finds it, it updates the Monarch registry and allows PCCARD to detect the card, by calling Monarch's Set Socket State.

The application requests the inserted card's PnP device ID from Monarch. It then tries to determine if the current Windows™ 95 installation contains an INF file that handles the card's installation process. If one is found it, it updates the Monarch registry entry and relinquishes control to Windows™ and allows it to go through the new device installation process. This is done by calling the Set Socket State in Monarch and allowing PCCARD to detect the card.

In some cases the card ID is found in one of the Windows™ INF files as a compatible ID. These types of devices are usually installed by Windows™ as Windows™ Default driver.

If the card's device ID is not found in any of the Windows™ installed INF files, the application tries to determine if the device is any of the devices that RM Card Services supports. This might requires Monarch to let RM Card Services / CardID to attempt to recognize the card. Otherwise the application tries to identify the card from its name. For example it checks for the word "modem" or "ATA" or "disk". It might also look up a list of card device ID to match the inserted card ID. When the card is identified by the appliction, it gives the user a choice between installing the card in compatibility mode (RM Card Services) or asks the user if he has a disk that contains the drivers. If the user decides to use a disk, the application will scan the disk for INF files first. It then looks for the device ID. If the device ID is found, the application invokes the Windows™ Device installer which start the installation process. To do this the application might need to copy the INF file to the Windows™ INF directory and add the file to the binary index. The application then adds the device ID to the registry and sets the card state to allow PCCARD to detect the card. If an INF file is not available, then the application tries to determine if a real mode installer exists on the disk and requests the user permission to run the installer.

In any of the above cases, when the application is trying to install the card as a real mode device, it is possible that RM Card Services is not loaded. In which case, the application needs to ask the user if he would like to reboot the system to have RM Card Services loaded. When the system is rebooted, the application will launch itself and continues with the installation process.

A further understanding of the illustrated embodiment may be attained by reference to the appendices filed herewith.

7. Multifunction IRQ Interface ("MIRQI")

MIRQI is an interface for the dispatch of IRQs from multifunction hardware, in particular, multifunction PCMCIA hardware which conforms to the PCCARD 16 specification.

MIRQI was developed to enable the sharing and dispatch of interrupts from multifunction PCMCIA hardware. Due to architectural constraints,multifunction PCMCIA hardware is limited to using a single hardware IRQ for all functions. This poses several problems for using multifunction PCMCIA cards, and some of these problems are shared with multifunction hardware developed for other buses.

One problem posed by multifunction hardware arises when trying to integrate such hardware into the standard device driver environment, particularly in Windows 3.X and Windows 95. Drivers in these environments typically are not written to allow sharable interrupts, and the operation of the multifunction hardware must be made to mimic the more common case of multiple single function devices each with their own interrupt. Under Windows 95, the layered driver model makes it difficult to implement drivers for certain classes of devices if the hardware is sharing an interrupt.

Another problem posed by multifunction hardware is integration of protected mode device drivers running as VxDs in Windows into the interrupt sharing interface developed by the PCMCIA committee. These drivers do not have access to the standard PCMCIA calls specified in the newest PCCARD standard, because the SystemSoft PCMCIA implementations runs in real mode and the VxDs run in protected mode under Windows.

The implementation of the MIRQI interface in a VxD enables more intelligent processing of multifunction IRQs so that this new hardware can be supported in the PC environment. In the full implementation, a MIRQI enabled VxD monitors the multifunction hardware IRQ. It then provides filtering of the IRQ by directing it to real mode Card Services, calling a protected mode client who has registered for the IRQ, or raising a secondary IRQ via software.

The interfaces place MIRQI functionality under the control of real mode Card Services, but a protected mode agent could also be used to recognize conditions where multifunction hardware requires extended IRQ processing. MIRQI is provided to Card Services as a V86__API (interface between a V×D and real mode software). Card Services calls MIRQI in the process of handling multifunction card insertion and client registration, and in reaction to Windows being loaded.

The PCCARD 16 standard provides a way for Card Services to determine what function of a multifunction card has interrupted the CPU. The determination is made by examining a memory mapped register on a multifunction card. One such register is required for each function on the card. Card Services is then responsible for dispatching the interrupt.

When Windows is running, Card Services enables the MIRQI IRQ filter in the MIRQI enabled VXD. The V×D is provided with the address of a register on the card, the interrupt to monitor, and either an interrupt to raise via software or a client driver handler for the interrupt residing in a client V×D. MIRQI also provides a way for Card Services to restore normal interrupt processing. In response Card Services invocation, the MIRQI V×D virtualizes the true multifunction interrupt, and stores the other information for processing during the hardware interrupt routine.

When a hardware interrupt occurs, the MIRQI enabled V×D reads any appropriate register on the multifunction card. If the V×D finds a function which requires service, it performs the required action (client call or software interrupt) and reflects the interrupt to Card Services for processing.

The current implementation does not yet handle calling clients. It is based on a previous SystemSoft design for an older multifunction card running under Windows. In this design, a multifunction card with ethernet and modem functions supported. The V×D for this card filtered interrupts, and invoked the modem interrupt when the modem interrupted the CPU.

Figure 4:
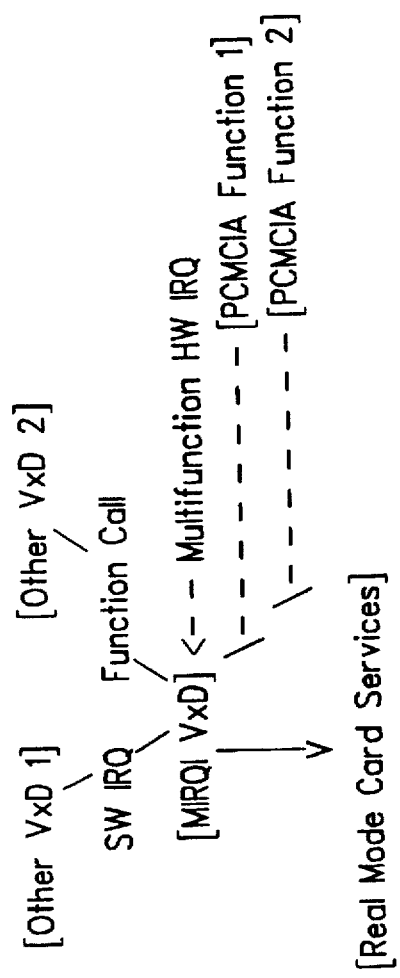
FIG. 4 depicts interrupt processing for multifunctional peripherals according to the invention.

FIG. 4 shows the possible interrupt processing in MIRQI in response to an interrupt. The diagram assumes Card Services has mapped the IRQ control registers into memory and enabled MIRQI IRQ filtering on the card interrupt.

CONCLUSION

The illustrated embodiment meets the objects set forth above. Thus, it provides, for example, methods and apparatus for controlling, and communicating with, peripheral devices with software clients executing in multiple addressing modes. It also provides, by way of further example, methods and apparatus for controlling, and communicating with, multifunction hardware devices.

It will be appreciated that the embodiments described herein are illustrative and that other methods and apparatus incorporating modifications thereto fall within the scope of the invention. Thus, for example, it will be appreciated that the invention operates with a range of hardware devices, not merely PCMCIA cards. It will also be appreciated that the invention can be applied to processor architectures, other than those of the 386-class microprocessors.

In view of the foregoing, we claim:

1. A digital data system comprising:

a central processing unit (CPU) that operates in first and second addressing modes;

peripheral devices comprising a first peripheral device and a second peripheral device;

at least one adapter for receiving said peripheral devices:

a first peripheral device service subsystem for handling communications between said first peripheral device in said at least one adapter and a first client executing on said CPU in said first addressing mode, and a second peripheral device service subsystem for handling communications between said second peripheral device in said at least one adapter and a second client executing on said CPU in said second addressing mode, wherein said first peripheral device service subsystem is in communication with said second peripheral device service subsystem to thereby provide concurrent availability of both said first and second peripheral device service subsystems, wherein said first peripheral device subsystem comprises a configuration management section for allocating digital data system resources for communications between said peripheral devices in said at least one adapter and said first and second clients executing on said CPU in any of said first and second addressing modes.

2. A digital data system according to claim 1, wherein said CPU operates in a real addressing mode and a protected addressing mode, said first peripheral device service subsystem handles communications between said first peripheral device in said at least one adapter and said first client executing in said protected addressing mode, and said second peripheral device service subsystem handles communications between said second peripheral device in said at least one adapter and said second client executing in said real addressing mode.

3. A digital data system according to claim 2, wherein said CPU is a microprocessor with a least one of a 386-class, 486-class or 586-class architecture.

4. A digital data system according to claim 1, wherein said configuration management section allocates digital data system resources including any of memory space, input/output space, direct memory access channels and interrupt (IRQ) levels.

5. A digital data system according to claim 1, wherein said first peripheral device service subsystem comprises:

a higher-level interface layer, in communication with at least one of said first and second clients, for coordinating accesses by said at least one of said first and second clients to said at least one adapter and to at least one of said first and second peripheral devices received therein, and a lower-level interface layer, in communication with said higher-level interface layer, for controlling and transferring information with said at least one adapter and said at least one of said first and second peripheral devices received therein.

6. A digital data system according to claim 5, comprising:

an interrupt/poll section, coupled with said higher-level interface layer, that responds to a change in status of a selected one of said at least one adapter with respect to one of said first and second peripheral devices for notifying said higher-level interface layer of that change, said higher-level interface layer being responsive to such notification for applying to said lower-level interface layer a status request, and said lower-level interface layer responsive to such a status request for generating a signal representative of a current status of said selected one of said at least one adapter and said one of said first and second peripheral devices received therein.

7. A digital data system according to claim 6, wherein said higher-level interface layer is a card services layer, said lower-level interface layer is an adapter services layer, and said status request is a GET_STATUS function.

8. A digital data system according to claim 5, wherein said higher-level interface layer is responsive to a change in status of said at least one adapter with respect to one of said peripheral devices for transmitting to said lower-level interface layer a status request concerning that adapter and that peripheral device therein.

9. A digital data system according to claim 8, wherein said lower-level interface layer is responsive to receipt of said status request following insertion of said one of said peripheral devices in said at least one adapter for initiating a determination of whether a client expected to communicate with said one of said peripheral devices will execute in said first or second addressing modes on said CPU.

10. A digital data system according to claim 9, wherein
said lower-level interface layer initiates said determination by signaling receipt of said status request, and
said first peripheral device service subsystem includes an extension of said higher-level interface layer, coupled with said lower-level interface layer, that responds to such signaling by identifying at least one of said first and second clients expected for use in communicating with said one of said peripheral devices.

11. A digital data system according to claim 10, wherein
said first peripheral device service subsystem includes a registry of said peripheral devices and at least one of said first and second clients expected to communicate therewith,
said extension of said higher-level interface layer being coupled with said registry for comparing an identification of said one of said peripheral devices inserted into said at least one adapter with said registry to determine whether at least one of said first and second clients expected for use in communicating with said one of said peripheral devices will execute in said first or second addressing modes.

12. A digital data system according to claim 10, wherein
said extension of said higher-level interface layer responds to identification of said one of said peripheral devices that is expected to communicate with said first client in said first addressing mode on said CPU by causing said lower-level interface layer to respond to said status request by signaling said higher-level interface layer of the current status of a selected one of said at least one adapter and said one of said peripheral devices therein, and
said higher-level interface layer responds to such signaling by initiating handling of communications between said one of said peripheral devices inserted in said selected one of said at least one adapter and said first client executing on said CPU in said first addressing mode.

13. A digital data system according to claim 10, wherein said extension of said higher-level interface layer responds to identification of said one of said peripheral devices that is expected to communicate with said second client in said second addressing mode on said CPU by (i) causing said lower-level interface layer to respond to said status request transmitted thereto by said higher-level interface with a signal indicating receipt of no peripheral device in the adapter, and (ii) initiating handling, by said second peripheral device service subsystem of communications between said one of said peripheral devices and said second client executing on said CPU in said second addressing mode.

14. A digital data system according to claim 13, wherein
said extension of said higher-level interface layer initiates handling of such communications by said second peripheral device service subsystem by signaling an inter-subsystem gateway,
said inter-subsystem gateway, which is coupled to said extension of said higher-level interface layer and said second peripheral device service subsystem, responds to such signaling by invoking said second peripheral device service subsystem to handle communications between said one of said peripheral devices and said second client executing on said CPU in said second addressing mode.

15. A digital data system according to claim 14, wherein said inter-subsystem gateway is coupled to said configuration management section for transferring thereto digital data system resources required for communications between said one of said peripheral devices and said second client executing on said CPU in said second addressing mode.

16. A digital data system according to claim 15, wherein said inter-subsystem gateway alters an apparent identification of said one of said peripheral devices to that associated with a peripheral device expected to communicate with a client that will execute in said first addressing mode, thereby enabling software applications executing on said CPU in said first addressing mode to communicate directly with said one of said peripheral devices.

17. A digital data system according to claim 1, wherein
said first peripheral device service subsystem includes peripheral device enumerator sections, coupled to said configuration management section, for transferring thereto digital data system resources required for communications between said first peripheral device in said at least one adapter and said first client executing on said CPU in said first addressing mode, and
an inter-subsystem gateway, coupled to said configuration management section and to said second peripheral device service subsystem, for communicating thereto digital data system resources required for communications between said second peripheral device in said at least one adapter and said second client executing in said CPU in said second addressing mode.

18. A digital data system according to claim 1, wherein said at least one adapter signals an interrupt to an interrupt/poll section to notify it of a change in status thereof with respect to one of said peripheral devices.

19. A digital data system according to claim 1, wherein an interrupt/poll section periodically polls at least one of said at least one adapter to determine whether there has been a change in status thereof with respect to one of said peripheral devices.

20. A method of operating a digital data system of the type having a central processing unit (CPU) that operates in first and second addressing modes, having peripheral devices, and having at least one adapter for receiving said peripheral devices, said method comprising:
handling, with a first peripheral device service subsystem, communications between a first peripheral device in said at least one adapter and a first client executing on said CPU in said first addressing mode,
handling, with a second peripheral device service subsystem, communications between a second peripheral device in said at least one adapter and a second client executing on said CPU in said second addressing mode,
providing concurrent availability of both said first and second peripheral device subsystems, and allocating digital data system resources for communications between said peripheral devices in said at least one adapter and said first and second clients executing on said CPU in any of said first and second addressing modes.

21. A method according to claim 20, comprising:

operating said CPU in a real addressing mode and a protected addressing mode, handling, with said first peripheral device service subsystem, communications between said first peripheral device in said at least one adapter and said first client executing in said protected addressing mode, and handling, with said second peripheral device service subsystem, communications between said second peripheral device in said at least one adapter and said second client executing in said real addressing mode.

22. A method according to claim 20, comprising coordinating, with a higher-level interface layer, accesses by at least one of said first and second clients to at least one of said at least one adapter and to at least one of said first and second peripheral devices received therein, and controlling, with a lower-level interface layer, at least one of said at least one adapter and at least one of said first and second peripheral devices received therein.

23. A method according to claim 22, comprising responding to a change in status of said at least one adapter with respect to one of said peripheral devices for notifying said higher-level interface layer of that change, responding, with said higher-lever interface layer, to such notification for applying to said lower-level interface section a status request, and normally responding, with said lower-level interface layer, to such a status request for generating a signal representative of a current status of a selected one of said at least one adapter and at least one of said first and second peripheral devices received therein.

24. A method according to claim 23, including responding, with said lower-level interface layer, to receipt of said status request following insertion of said one of said peripheral devices in said selected one of said at least one adapter for initiating a determination of whether at least one of said first and second clients expected to communicate with that peripheral device will execute in said first or second addressing modes on said CPU.

25. A method according to claim 24, including responding to a determination that no client expected for use in communicating with said one of said peripheral devices will execute in said first addressing mode by:

initiating handling by said second peripheral device service subsystem of initiation of communications between said one of said peripheral devices and said second client executing on said CPU in said second addressing mode, altering the identification of said one of said peripheral devices to that associated with a peripheral device expected to communicate with a client that will execute in said first addressing mode, and initiating handling of further communications between said one of said peripheral devices and said first client executing on said CPU in said first addressing mode.

26. A method according to claim 24, including responding to identification of said one of said peripheral devices that is expected to communicate with said first client in said first addressing mode on said CPU by handling of communications between said one of said peripheral devices inserted in said selected one of said at least one adapter and said first client executing on said CPU in said first addressing mode.

27. A method according to claim 24, including responding to identification of said one of said peripheral devices that is expected to communicate with said second client in said second addressing mode on said CPU by:

causing said lower-level interface layer to respond to said status request transmitted thereto by said higher-level interface with a signal indicating receipt of no peripheral device in said selected one of said at least one adapter, and initiating handling by said second peripheral device service subsystem of communications between said one of said peripheral devices and said second client executing on said CPU in said second addressing mode.

* * * * *